US011110485B1

(12) United States Patent
Lee et al.

(10) Patent No.: US 11,110,485 B1
(45) Date of Patent: *Sep. 7, 2021

(54) APPLICATOR SYSTEM FOR EXTRUSIVE DISPENSING OF WORK MATERIAL FROM COLLAPSIBLE CARTRIDGE

(71) Applicants: PATENT & INVESTMENT LLC, Jessup, MD (US); NORDSON CORPORATION, Westlake, OH (US)

(72) Inventors: Albert Lee, Clarksville, MD (US); Brian Glass, West Friendship, MD (US); John Hunter, Moon Township, PA (US); Brian Dauphinais, Brooklyn, CT (US); Brent Giansanti, Ellington, CT (US)

(73) Assignees: Patent & Investment, LLC, Jessup, MD (US); Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,118

(22) Filed: Dec. 31, 2018

Related U.S. Application Data

(63) Continuation of application No. 15/130,334, filed on Apr. 15, 2016, now Pat. No. 10,166,570.

(Continued)

(51) Int. Cl.
*B67D 7/70* (2010.01)
*B05C 17/015* (2006.01)
(Continued)

(52) U.S. Cl.
CPC ........ *B05C 17/015* (2013.01); *B05C 17/0052* (2013.01); *B05C 17/00559* (2013.01);
(Continued)

(58) Field of Classification Search
CPC .............. B05C 17/015; B05C 17/0052; B05C 17/00553; B05C 17/00559; B05C 17/00583; B05C 17/00596
See application file for complete search history.

(56) References Cited

U.S. PATENT DOCUMENTS 3,767,085 A * 10/1973 Cannon ................ A61C 9/0026
222/82
4,871,088 A * 10/1989 Cox .................. B05C 17/00506
222/47

(Continued)

*Primary Examiner* — J C Jacyna
(74) *Attorney, Agent, or Firm* — Rosenberg, Klein & Lee

(57) ABSTRACT

An applicator system for extrusive dispensing of work material from a flexible pre-charged portion of a cartridge unit is provided. The system comprises a body portion having an actuator and a housing coupled thereto. The housing includes a cartridge bay and an arresting member displaceably coupled thereto. The cartridge bay is configured to receive the cartridge unit and defines at least one containment compartment for receiving the pre-charged cartridge. The arresting member is displaceable between open and closed configurations for releasably retaining the cartridge unit. The actuator, coupled to the housing in communication with the cartridge bay, includes a drive member engaging the pre-charged cartridge within the containment compartment. The body includes a handle and an activation member coupled thereto. The activation member is coupled to the actuator to selectively activate displacement of the drive member within the containment compartment responsive to user manipulation thereby compressing the pre-charged cartridge therein.

19 Claims, 11 Drawing Sheets

Related U.S. Application Data

(60) Provisional application No. 62/147,653, filed on Apr. 15, 2015.

(51) Int. Cl.
 *G01F 23/02* (2006.01)
 *B05C 17/005* (2006.01)

(52) U.S. Cl.
 CPC .. *B05C 17/00583* (2013.01); *B05C 17/00596* (2013.01); *G01F 23/02* (2013.01)

(56) References Cited

U.S. PATENT DOCUMENTS

| | | | | |
|---|---|---|---|---|
| 5,161,715 A | * | 11/1992 | Giannuzzi | B05C 17/00506 222/105 |
| 5,332,122 A | * | 7/1994 | Herold | B05C 17/00509 222/105 |
| 5,875,928 A | * | 3/1999 | Muller | B05C 17/00553 222/137 |
| 5,897,028 A | * | 4/1999 | Sauer | B05C 17/00506 222/105 |
| 6,048,201 A | * | 4/2000 | Zwingenberger | B05C 17/00583 433/90 |
| 10,166,570 B1 | * | 1/2019 | Lee | B05C 17/015 |
| 2010/0089949 A1 | * | 4/2010 | Gramann | A61C 9/0026 222/137 |
| 2013/0186912 A1 | * | 7/2013 | Yeh | B65D 83/0005 222/137 |
| 2013/0341352 A1 | * | 12/2013 | Williams | B05B 11/048 222/95 |
| 2015/0069091 A1 | * | 3/2015 | Mizoguchi | B05C 17/015 222/389 |

\* cited by examiner

APPLICATOR SYSTEM FOR EXTRUSIVE DISPENSING OF WORK MATERIAL FROM COLLAPSIBLE CARTRIDGE

RELATED APPLICATION DATA

This Application is a continuation of co-pending U.S. patent application Ser. No. 15/130,334, filed 15 Apr. 2016, which is based on Provisional Patent Application No. 62/147,653, filed 15 Apr. 2015.

BACKGROUND OF THE INVENTION

Various applicator devices for dispensing sealant, adhesive, epoxy, caulk, and other such pasty work materials are known in the art. They include handheld gun-type devices in which a cartridge containing a work material is loaded into a given applicator device and engaged by the device's drive mechanism. Actuation of the drive mechanism then causes the extrusive flow of material from the loaded cartridge for application on a particular work surface or area. These applicator devices are used in various fields for a variety of different applications.

Currently existing applicator devices typically receive and dispense material packaged in rigid cartridges. However, it is desirable to create a system which may be used to effectively dispense material packaged in flexible cartridges. Among other things, flexible cartridges tend to be less bulkier than their more rigid counterparts and therefore may be made through a simpler, more efficient manufacturing processes. Their manufacture thus consumes less resources and tends to be more cost effective while being more beneficial for the environment as it generates less waste.

SUMMARY OF THE INVENTION

It is an object of the present invention to provide an applicator system for extrusive dispensing of work material which provides sufficient reinforcement to stabilize flexible cartridge units containing the work material.

It is another object of the present invention to provide an applicator system with a cartridge bay having an open end having an arresting member coupled thereto to enable simple and convenient insertion and removal of flexible cartridges therefrom.

It is a further object of the present invention to provide an applicator system which allows different work materials to be simultaneously extruded from a plurality of cartridges as a consistent mixture in predetermined proportions.

These and other objects are attained by an applicator system for extrusive dispensing of work material from a flexible pre-charged portion of a cartridge unit. The system comprises a body portion having an actuator portion and a housing portion coupled thereto. The housing portion includes a cartridge bay and an arresting member displaceably coupled thereto. The cartridge bay is configured to receive the cartridge unit and defines at least one containment compartment configured to receive the pre-charged cartridge of the cartridge unit. The arresting member is displaceable between open and closed configurations for releasable retention of the cartridge unit in the cartridge bay. The actuator portion is coupled to the housing portion in communication with the cartridge bay. The actuator portion includes a drive member engaging the pre-charged cartridge within the containment compartment. The body portion includes a handle and an activation member coupled thereto. The activation member is coupled to the actuator portion to selectively activate displacement of the drive member within the containment compartment responsive to user manipulation. The drive member is selectively driven thereby to compress the pre-charged cartridge within the containment compartment.

In other embodiments an applicator system for extrusive dispensing of work material from flexible pre-charged portions of a cartridge unit is provided. The system comprises a body portion having an actuator portion and a housing portion coupled thereto. The housing portion includes a cartridge bay defining a plurality of containment members respectively defining a plurality of containment compartments each configured to receive one pre-charged cartridge of a cartridge unit in substantially conformed manner therein. The cartridge unit has a dispensing cap forming a mixer head and a plurality of pre-charged cartridge sections extending therefrom. The housing portion also includes a bracket secured about a terminal end region of the cartridge bay and an arresting member which is pivotally coupled to the bracket to be displaceable between open and closed configurations for releasable retention of the cartridge unit in the cartridge bay. The actuator portion is coupled to the housing portion in communication with the cartridge bay. The actuator portion includes a drive member engaging the pre-charged cartridge within the containment compartment. The body portion includes a handle and an activation member coupled thereto. The activation member is coupled to the actuator portion to selectively activate displacement of the drive member within the containment compartment responsive to user manipulation. The drive member is selectively driven thereby to compress the pre-charged cartridge within the containment compartment.

In further embodiments an applicator system for extrusive dispensing of work material from flexible pre-charged portions of a cartridge unit is provided. The comprises a body portion having an actuator portion and a housing portion coupled thereto. The housing portion includes a cartridge bay defining a plurality of containment members respectively defining a plurality of containment compartments each configured to receive one pre-charged cartridge of a cartridge unit in substantially conformed manner therein. The cartridge unit has a dispensing cap forming a mixer head and a plurality of pre-charged cartridge sections extending therefrom. The housing portion also includes bracket secured about a terminal end region of said cartridge bay and an arresting member which is pivotally coupled to the bracket to be displaceable between open and closed configurations for releasable retention of the cartridge unit in the cartridge bay. The arresting member defines a notched passage to receive an elongate tip portion of the cartridge unit therethrough when the arresting member is in the closed configuration to retain the cartridge unit within the cartridge bay. The housing portion further includes a level indicator disposed in displaceable manner over the cartridge bay. The level indicator is displaceable with the driving member to visually indicate the location thereof within the containment compartment. The actuator portion is coupled to the housing portion in communication with the cartridge bay and the actuator portion includes a drive member engaging the pre-charged cartridge within the containment compartment. The body portion includes a handle and an activation member coupled thereto. The activation member is coupled to the actuator portion to selectively activate displacement of the drive member within the containment compartment responsive to user manipulation. The drive member is selectively driven thereby to compress the pre-charged cartridge within the containment compartment.

DETAILED DESCRIPTION OF THE PREFERRED EMBODIMENTS

In broad concept, the present invention is directed to a system for dispensing and applying a work material to various work areas. More specifically, the present invention is directed to an applicator system that receives and effectively dispenses material from one or more collapsible cartridges. The applicator system enables simple yet efficient operation, even with so-called soft cartridges of materials that are formed without the rigid canister-like structure prevalent in typical cartridges.

Depending on the intended application, the subject applicator system may be manually powered by user manipulation of one or more triggers. Alternatively, the system may be power assisted (either partially or fully), where user activation of a trigger actuates a power-assisted, automatic drive of the dispensing process. The power assist may be of pneumatic, hydraulic, electro-mechanical, electro-magnetic, or any other type suitable for the intended application. In one exemplary embodiment illustrated herein, the system is of pneumatically powered type which preferably though not necessarily interconnects (through an interconnection nipple provided on the handle) to external offboard source of pressurized fluid (not shown). In other embodiments, a self-contained local source of pneumatic pressure may be alternatively provided onboard the applicator system.

Figure 7:
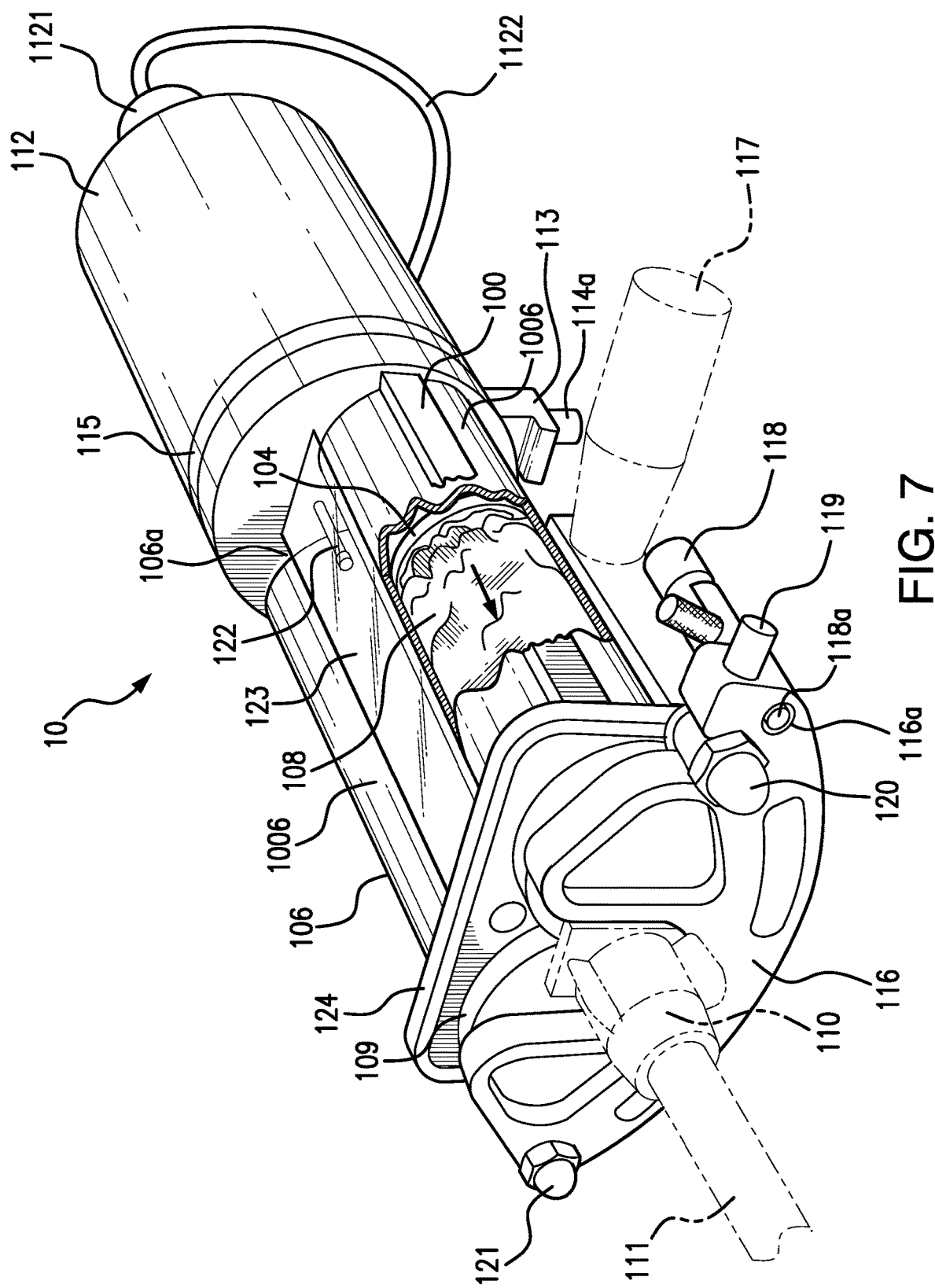
FIG. 7 is a perspective view of the system embodiment of FIG. 1, partially cut away, to illustratively reveal a portion of a flexible cartridge unit undergoing controlled compression within a compartment defined by the cartridge bay responsive to advancement of a piston therein.
Figure 8:
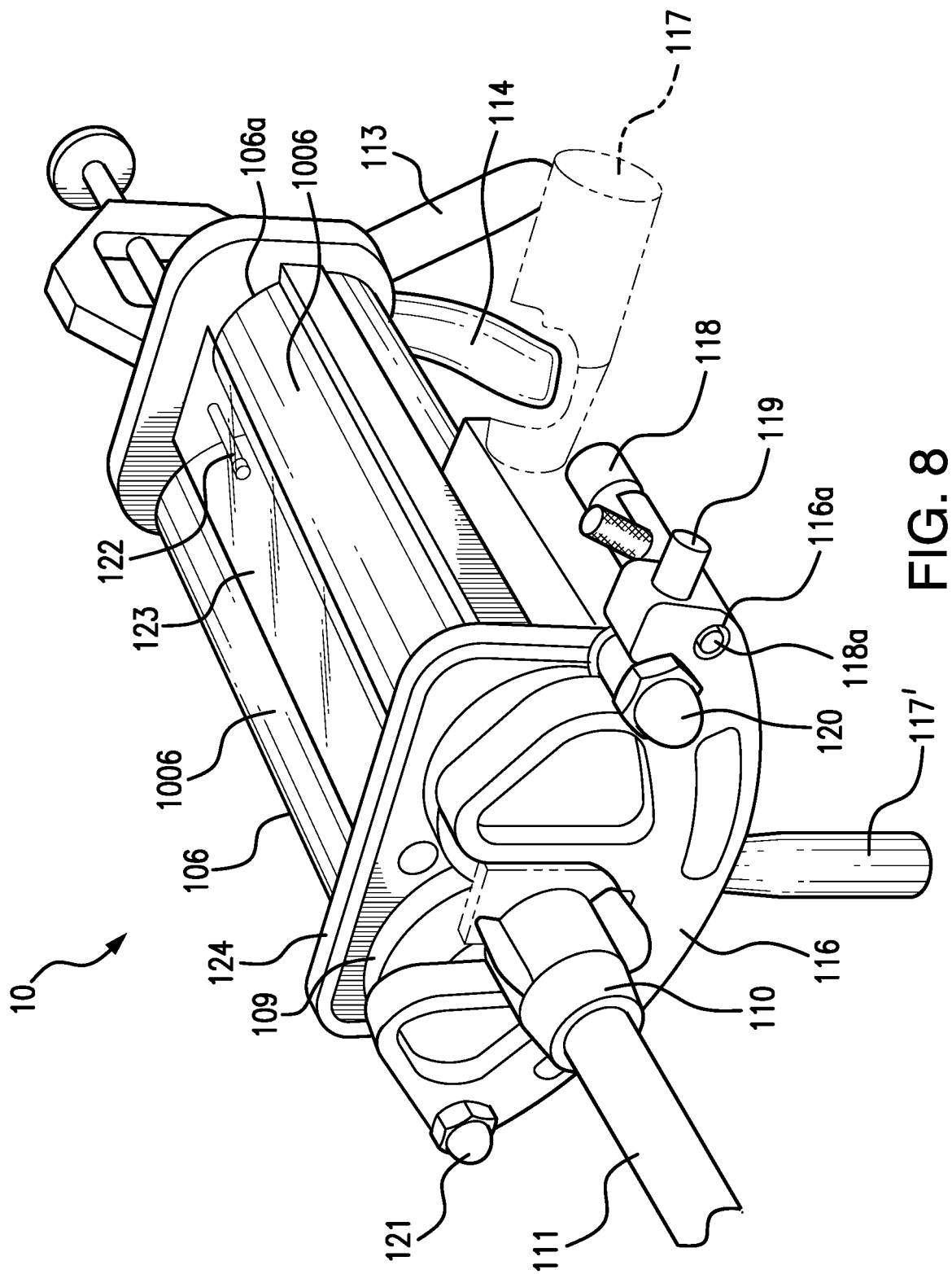
FIG. 8 is a perspective view of an applicator system formed in accordance with an exemplary alternate embodiment of the present invention, in a manually powered implementation, shown with the arresting member in a closed configuration.
Figure 9:
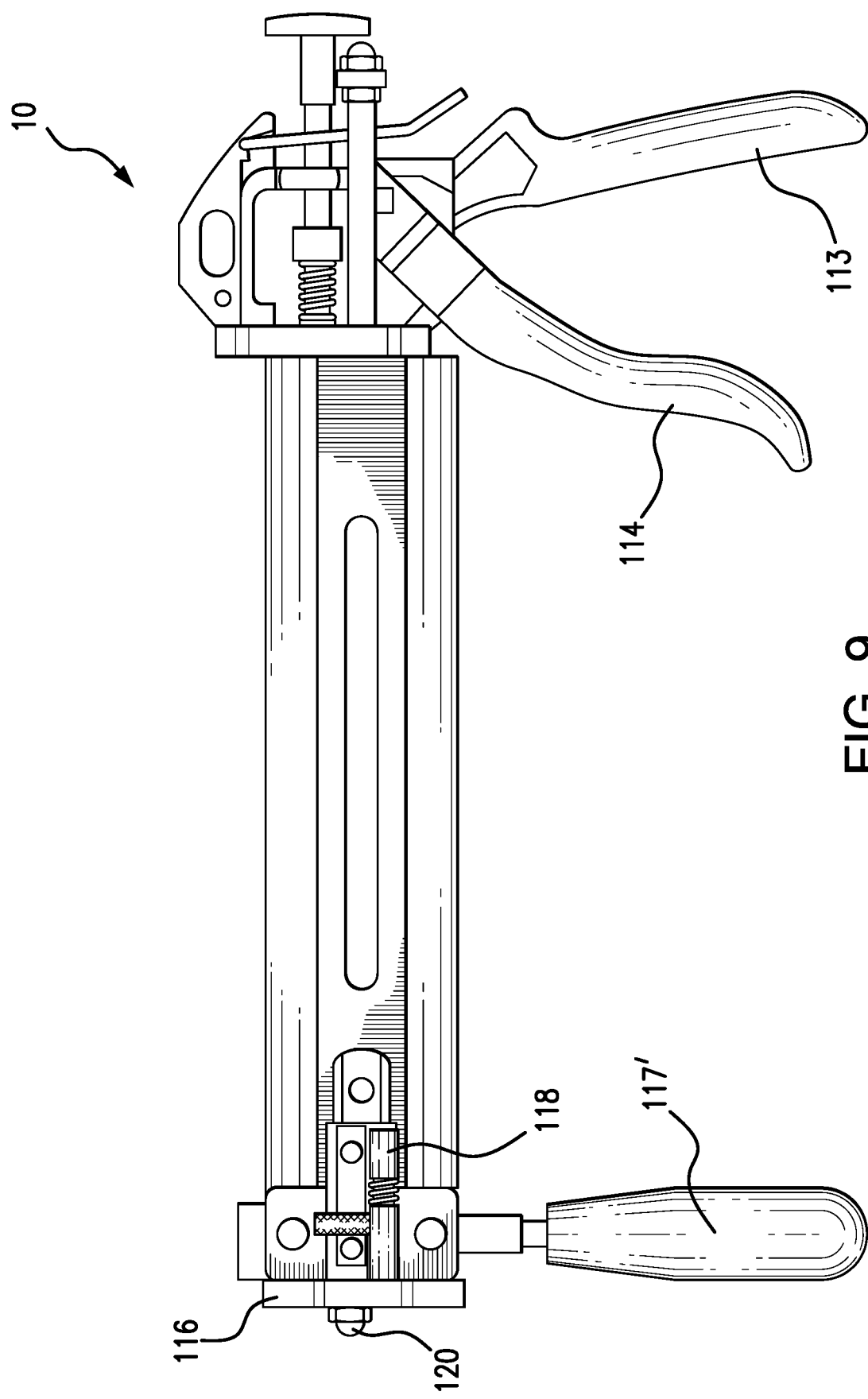
FIG. 9 is a side elevational view of the applicator system embodiment shown in FIG. 8; and, FIG. 10 is a perspective view, partially cut away, of illustrating one example of a cartridge unit structure shown with multiple flexible cartridges extending from a cartridge face plate, and a dispensing tip portion covered by a dispensing cap portion.

A first exemplary embodiment of the system 10 is illustratively shown in FIGS. 1-7. System 10 in this embodiment is pneumatically powered. An exemplary alternate embodiment such as shown in FIGS. 8-9 is manually powered. For brevity and clarity of description, the other portions of the system in the manually powered embodiment shown are illustratively though not necessarily of like structural configuration (with respect to those of the automatically powered embodiment shown). Those skilled in the art will readily recognize that such portions of the system may be formed in other embodiments and implementations with various different but functionally equivalent structures suitable for the particularly intended application.

In each of the exemplary embodiments, the system 10 generally includes a body portion 100 having an actuator portion 101 coupled thereto, which actuator portion 101 provides automatically-powered or manually-powered drive of a suitable drive member for dispensing of work material(s), depending on the embodiment. The system 10 further includes a housing portion 105 coupled to the body portion 100 which defines a cartridge bay 106. The cartridge bay 106 is suitably configured to receive at least one cartridge unit 107 therein. The cartridge bay 106 defines one or more compartments to respectively receive the one or more cartridge(s) 108 of the cartridge unit 107 initially filled, or pre-charged, with one or more work materials. The individual cartridges 108 are made of flexible material, and the cartridge bay 106 is configured to act as an enveloping containment structure for the cartridge unit 107 which provides ample, stable support to the flexible cartridges 108.

Figure 1:
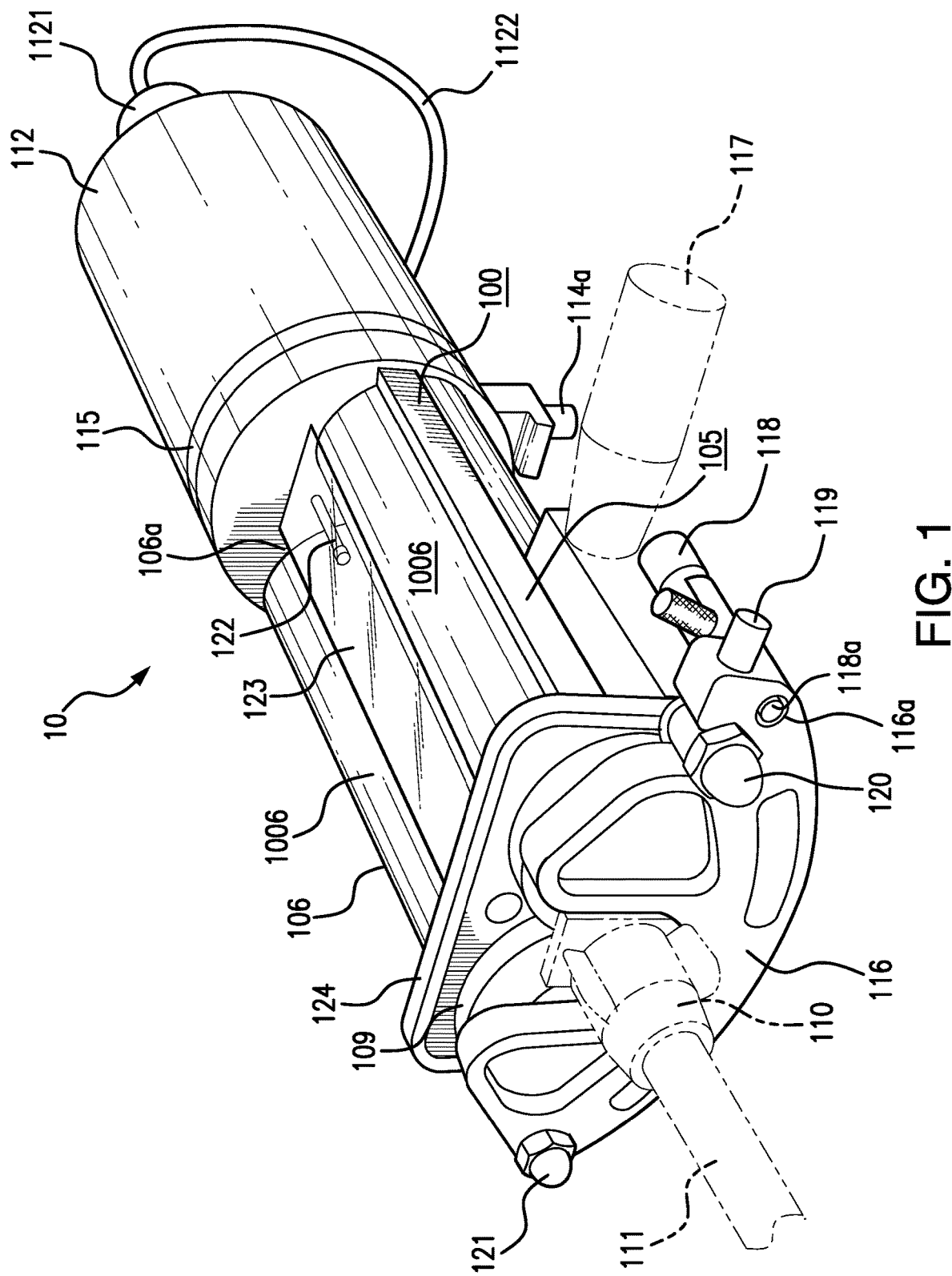
FIG. 1 is a side perspective view of an applicator system formed in accordance with an exemplary embodiment of the present invention, in an automatically powered implementation, illustrating a flexible cartridge unit received in a cartridge bay and secured therein by an arresting member disposed in a closed configuration.
Figure 1A:
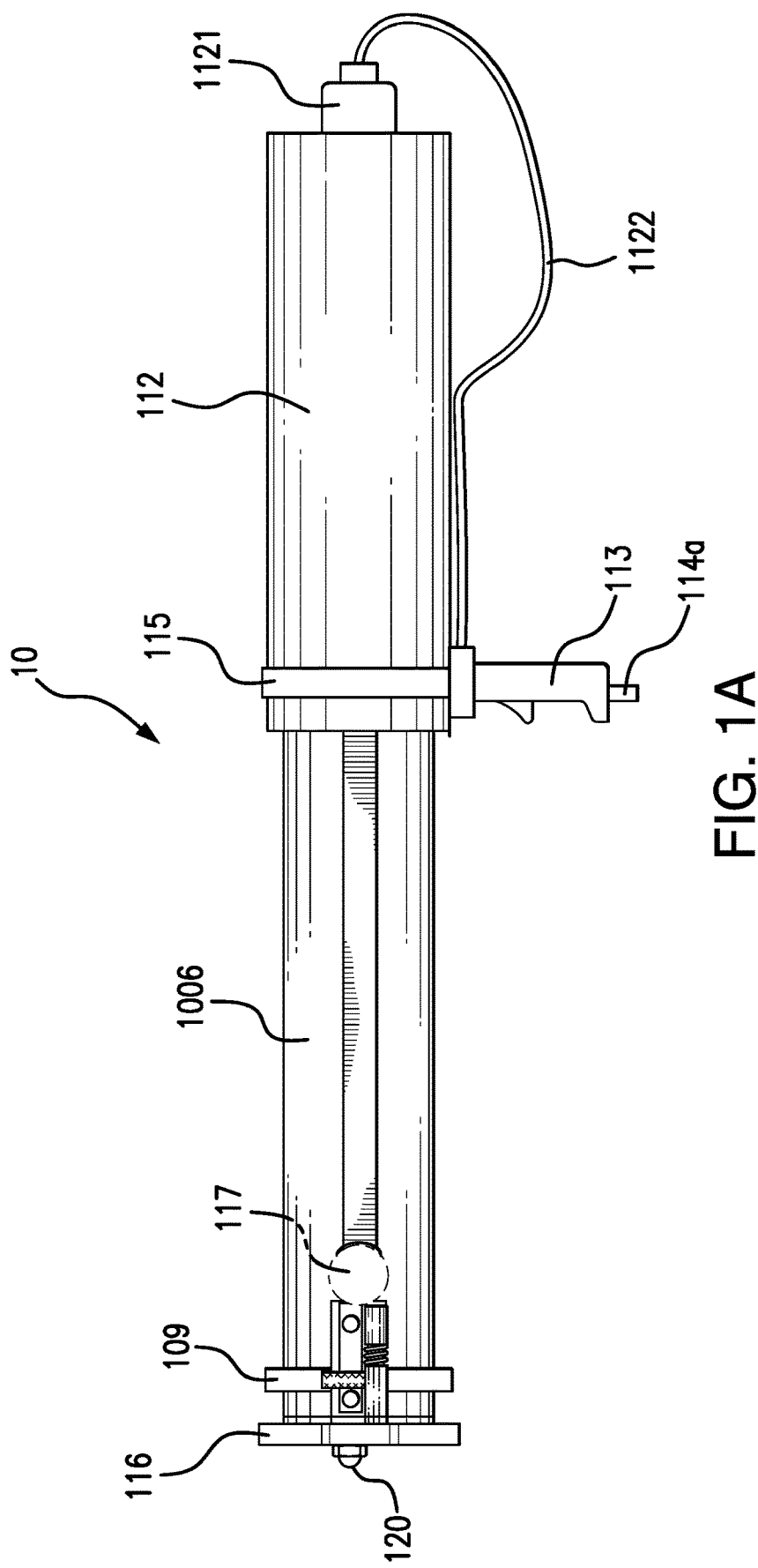
FIG. 1A is a side elevational view of the applicator system embodiment shown in FIG. 1.
Figure 2:
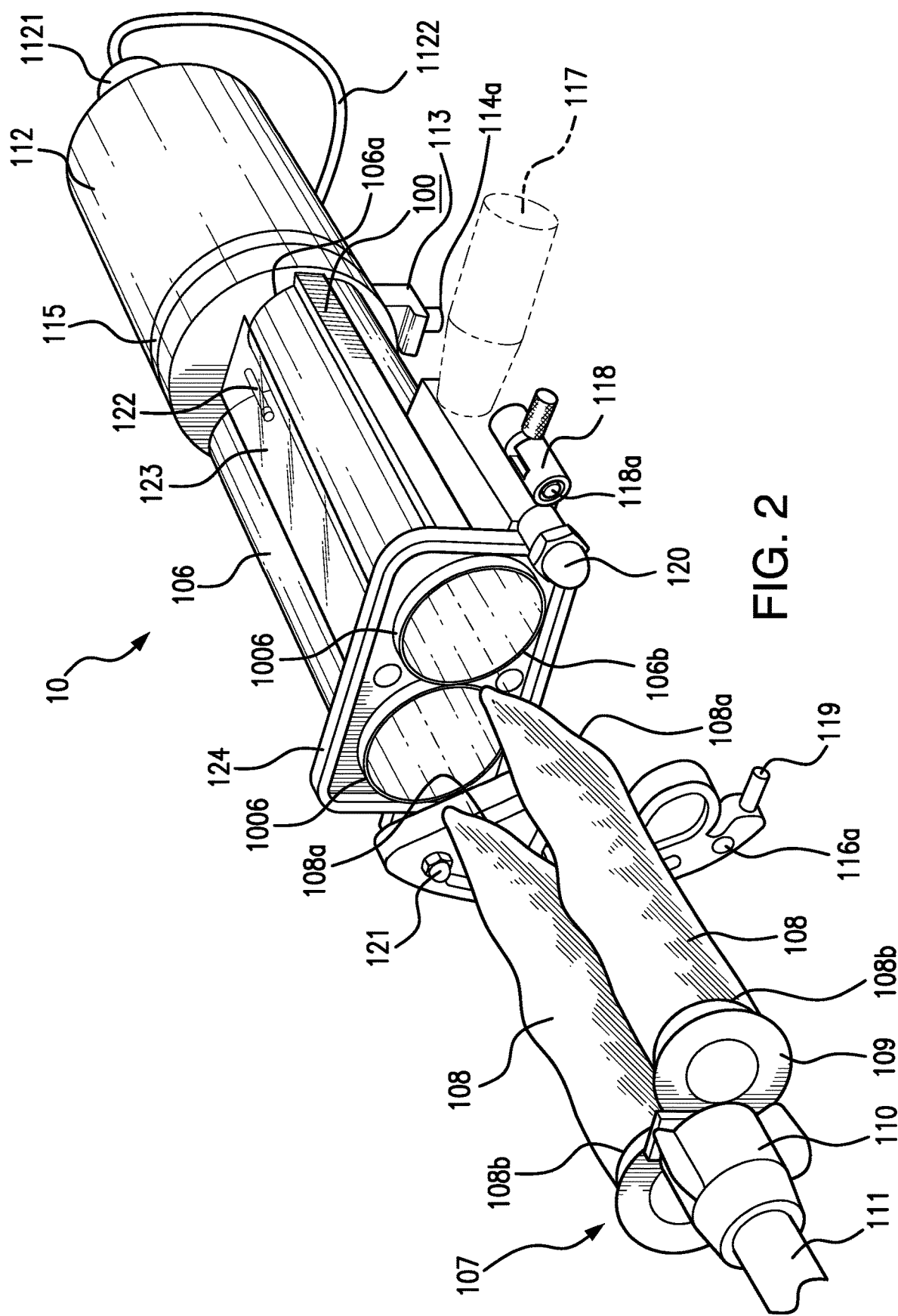
FIG. 2 is a side perspective view showing the applicator system embodiment of FIG. 1, illustrating the arresting member in an open configuration for insertion or removal of the flexible cartridge unit into/from the cartridge bay.

A handle 113 is coupled to the body portion 100 for selective control of the actuator portion 101 relative to the housing portion 105. The handle 113 is provided with an actuation trigger whose manipulation actuates forced extruded dispensing of the cartridge-contained materials. A supplemental stabilizing handle 117 may be connected to a front portion of body 100 as seen in FIGS. 1-2. When employed stabilizing handle 117 helps the user support and guide the system 10 during system operation, so that work materials may be expelled onto a desired surface in a neat and efficient manner Whether a user prefers single handed operation, or whether they prefer to use two hands on handle 113, such will not impact the overall functioning of the applicator system 10, though using both handles 113, 117 helps to balance the applicator 10. The manually powered applicator system 10 as shown in FIGS. 8-9 is preferably though not necessarily also equipped with a stabilizing handle 117 similarly situated and oriented in the preceding embodiment. Depending on the requirements of the particularly intended application, it may be provided at one or more other positions and/or orientations, such as indicated by the vertically oriented stabilizing handle 117'.

In the exemplary embodiment shown in FIGS. 1-7, the body portion 100 further includes a pneumatic cylinder 112 which is disposed adjacent a distal end of the cartridge bay 106 and in communication therewith. The pneumatic cylinder 112 stores pressurized air (or other suitable gas) and applies the same to pneumatically drive piston portions 102 of the actuator 101 to extend or retract accordingly, in response to activation of an activation member, such as a trigger 114, disposed on handle 113. In this embodiment, handle 113 is secured to the pneumatic cylinder by a strap 115. The strap 115 is repositionable which allows for the handle 113 to adopt a variety of configurations about the pneumatic cylinder 112 depending upon the particular application or preferences of the user based upon what position of the handle 113 they find to be the most comfortable or easiest to use. The applicator system 10 may be oriented at a variety of different angles and a user can adjust the position of the handle depending upon the most optimal orientation angle or simply upon user preference based on comfort.

The handle 113 is equipped with an interconnection inlet/nipple 114a to which an external supply of pressurized air or other such fluid may be coupled. Pressurized air received through the inlet 114a is routed through the handle 113 on to an air hose 1122 connected to extend between the handle 113 and a regulator 1121 secured to the pneumatic cylinder 112. The regulator 1121 controls the amount of pressurized fluid (such as a stream of air) let into the pneumatic cylinder 112. A forward/reverse button is preferably provided on the regulator 120 for selectively setting the piston drive direction to be powered responsive to trigger activation.

The housing portion 105 in the exemplary embodiment defines a cartridge bay 106 which preferably includes a plurality of containment members, such as the tubular/cylinder structures illustrated for example, which respectively form containment compartments 1006. As can be seen in FIG. 2, each of the containment compartments 1006 is configured for receiving and containing a cartridge 108 of the cartridge unit 107 in snug, substantially conformed manner. In the embodiment illustrated in FIGS. 8-9, the containment compartments 1006 are configured much in the manner shown in FIG. 2. The cartridges 108 are each filled with a given material and are flexible in construction. Each of the containment compartments 1006 closely surround the cartridge 108 pre-charged with work material, so that it maintains ample support and reinforcement of the cartridge 108 for efficient compression. In other words, they are configured to constrain the volume about the flexible cartridges 108, so that when the cartridges 108 are driven by the pistons, they do not unduly bend or otherwise deflect, and the driving power of the pistons is transferred efficiently and consistently towards forcibly extruding the materials contained in the cartridges 108.

As clearly shown in FIGS. 1-8, the containment compartments 1006 are preferably though not necessarily formed by barrel-like or cylindrical structures as generally tubular-shaped chambers of the cartridge bay 106. However, it will be appreciated that the containment compartments 1006 may be formed with a variety of other suitable shapes and configurations depending on the particularly intended application and design preferences, so long as the resulting compartments provide sufficient support for the cartridges 108 contained therein and adequately constrain the volume thereof. For instance, the containment compartments 1006 may be formed for example to define an oblong, polygonal, or other suitably shaped sectional contour rather than the generally circular sectional contour of the cylindrical structures shown in FIGS. 1-8. Additionally, while shown as fully encircling cylinders, the containment compartments 1006 may be formed with partially open or interrupted wall surfaces, so long as they collectively preserve sufficiently consistent support about the flexible cartridges contained therein and further, are of such inner structure that they do not pose a snag hazard for the flexible cartridge or otherwise cause the cartridge to get stuck at any point therewithin.

In the illustrated embodiment, the cartridge bay 106 includes two separately formed cylinders defining the containment compartments 1006. Suitable securement measures are preferably employed in the cartridge bay 106 to hold the cylinders together and prevent relative movement during system operation. Alternatively, while shown to be defined by separate and distinct structures, the containment compartments 106 may be defined within a cartridge bay 106 whose cylinders are integrally formed as portions of a unitary structure.

The cartridge bay 106 surrounds each collapsible cartridge 108 sufficiently that when pressed along the longitudinal direction by a disk 104 of a piston 102 of the actuator 101 from one end of the cartridge bay 106, the material in the cartridge 108 is squeezed forward toward a dispensing cap 110 then dispensing tip 111. As described in preceding paragraphs, the collapsible cartridge 108 may be of the so-called 'soft cartridge' type formed of a suitable flexible material that defines a containment skin—or film—which expands when filled with the material and collapses when compressed. The surrounding inner walls of each cartridge bay 106 of the housing portion 105 thus provide the counter-support that the tubular cylinder of a conventional push-up type of non-collapsible cartridge would provide. This obviates the need for such built-in tubular cylinder shell for the cartridge, allowing the system 10 to directly receive soft cartridges or other such collapsible cartridges and reliably dispense the material smoothly and regularly therefrom.

Each cartridge bay 106 may be formed with any suitable structural configuration, with any shape and contour suitable for the given collapsible cartridge and for the particular requirements of the intended application. But each cartridge bay 106 is configured to provide optimal combinations of strength, rigidity, weight, simplicity, and cost. In the disclosed embodiments, the cartridge bay is configured preferably to accommodate a multi-component soft cartridge unit 107 having multiple collapsible sections (cartridges 108) that terminate at separate proximal ends 108a but merge together at a joint distal end 108b member. The proximal ends 108a of the cartridges 108 are closed off (such as at a seam) to prevent the seepage of air therethrough and premature curing of the work material contained. The cartridges 108 are preferably sealed against air infiltration and may be made of foil-type aluminum, plastic or vinyl film, or other flexible material of suitable type known in the art for the requirements of the particularly intended application. Preferably, the seams of the cartridges 108, if any, are sealed in such a way as to prevent air from seeping into the bag.

Such multi-component cartridge units are used, for example, to concurrently dispense a mixture of various compositions for sealant, adhesive, epoxy, caulk, and/or other such pasty materials known in the art. To that end, the cartridge bay 106 includes two containment compartments 1006 which, as shown in FIG. 2 are adaptively configured to receive one of the cartridges 108 of the cartridge unit 107.

While the cartridge unit 107, such as a so-called film pack, is shown with individual cartridges 108 which are identical in length and width and diameter, individual cartridges of different cartridge units, or even the same cartridge unit, may have a different length, width or diameter than the other depending on the specific design objectives. For instance, depending on the mixing ratio of certain work material, one of the cartridges 108 may be smaller than the other to obtain the desired mix ratio. For such applications, the containment compartments 1006 of the cartridge bay 106 are preferably configured to suitably accommodate the differently sized (diameter) cartridges, and maintain sufficient support and rigidity about each of the cartridges contained therein. The disk 104 of the piston 102 would be suitably sized so that it preferably has a diameter which substantially matches that of the containment compartment. Each piston thus maintains stable positioning as it advances longitudinally within the containment compartment to engage a terminal end of the cartridge and compresses work material therefrom by pushing toward the forward end of the cartridge (supported against the arresting member) as retained radially within the surrounding inner walls of the containment compartment.

The housing portion 105 includes a displaceable arresting member 116 at its forward, or distal, end 105a (away from the body portion) which serves to releasably secure a forward end 108a of the cartridge unit 108 emerging from the containment compartment 1006 of the cartridge bay 106. In the disclosed embodiment, the arresting member 116 is pivotally coupled to a bracket 124 disposed about the cartridge bay 106 to swing between open and closed configurations. In the open configuration, shown in FIG. 2, the arresting member 116 is swung out of the way to open access to the containment compartments 1006 so that the cartridges 108 of the cartridge unit 107 can be easily slid in or out. In the closed configuration (as shown in FIGS. 1, 7 and 8), the arresting member 116 forms a plate-like gate which blocks the cartridge unit 107 snuggly in place, against release from the open first terminal end 106a of the cartridge bay 106. The arresting member 116 engages the face plate 109 of the cartridge unit 107 and which is secured to a bracket 124 disposed about a forward (distal) end portion of the cartridge bay's cylinder structures forming the containment compartments 1006. Such engagement also provides reinforcing support at the cartridge unit's dispensing cap portion 110, which is preferably cradled within a suitably notched portion of the arresting member 116. This maintains secure, stable retention of the cartridge unit within the cartridge bay.

In the embodiments shown, the multiple cartridges 108 respectively containing multiple material components are employed in tandem. The flexible, pouch-like skins/films which collapsibly make up the filled cartridges 108 are provided much like multiple tubes of caulk, having a combined dispensing cap structure which positions their respective dispensing portals to converge at a central point, the dispensing cap portion 110, defined on the cartridge unit 107. The respective material components contained within the cartridges 108, for example, components M and K, mix as they are dispensed into a static mixer head (defined by the dispensing cap portion 110). By the time they leave the mixer for extrusion through the dispensing tip portion 111, the components' mixture ratio is precisely what it should be because the M component side contributes one part of the desired composition while and the K component side concurrently contributes the other. Once those components interact, the resulting mixture cures within a certain time.

The pistons 102 for driving the component materials to dispense from the two cartridge sections are preferably actuated together concurrently, however, they may be configured in certain embodiments and implementations to actuate independently, or even separately (for instance to dispense the components alternatively in isolation from one another), depending on the objectives of a particular application. In the embodiment shown in FIGS. 1-7, the pistons 102 are pneumatically activated, and manually activated in the embodiment shown in FIGS. 8-9.

Figure 3:
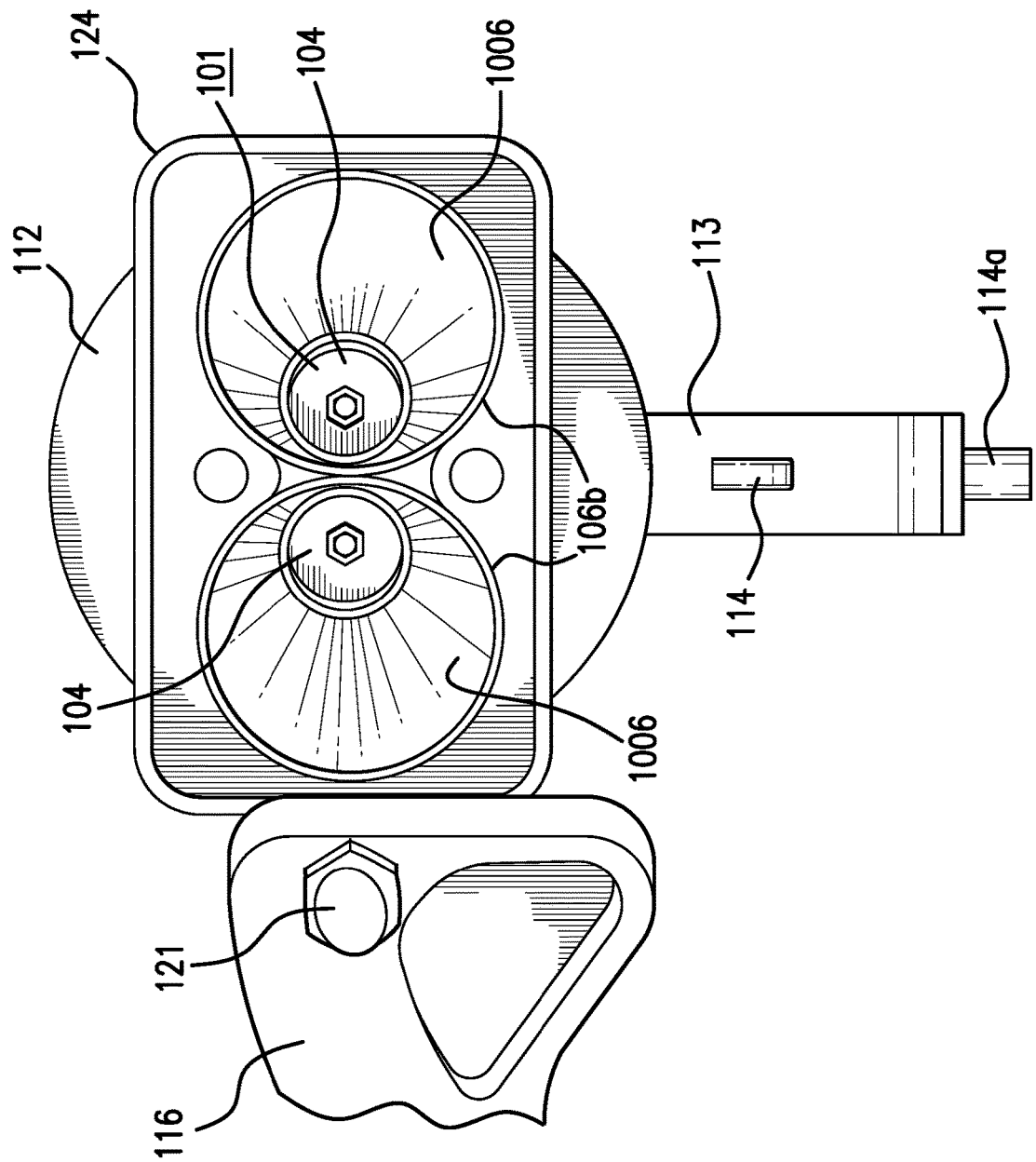
FIG. 3 is a frontal perspective view, partially cut away, of a portion of the applicator system embodiment of FIG. 1, with the arresting member in the open configuration to reveal disks of the pistons retracted to the bases of compartments defined by the cartridge bay.
Figure 4:
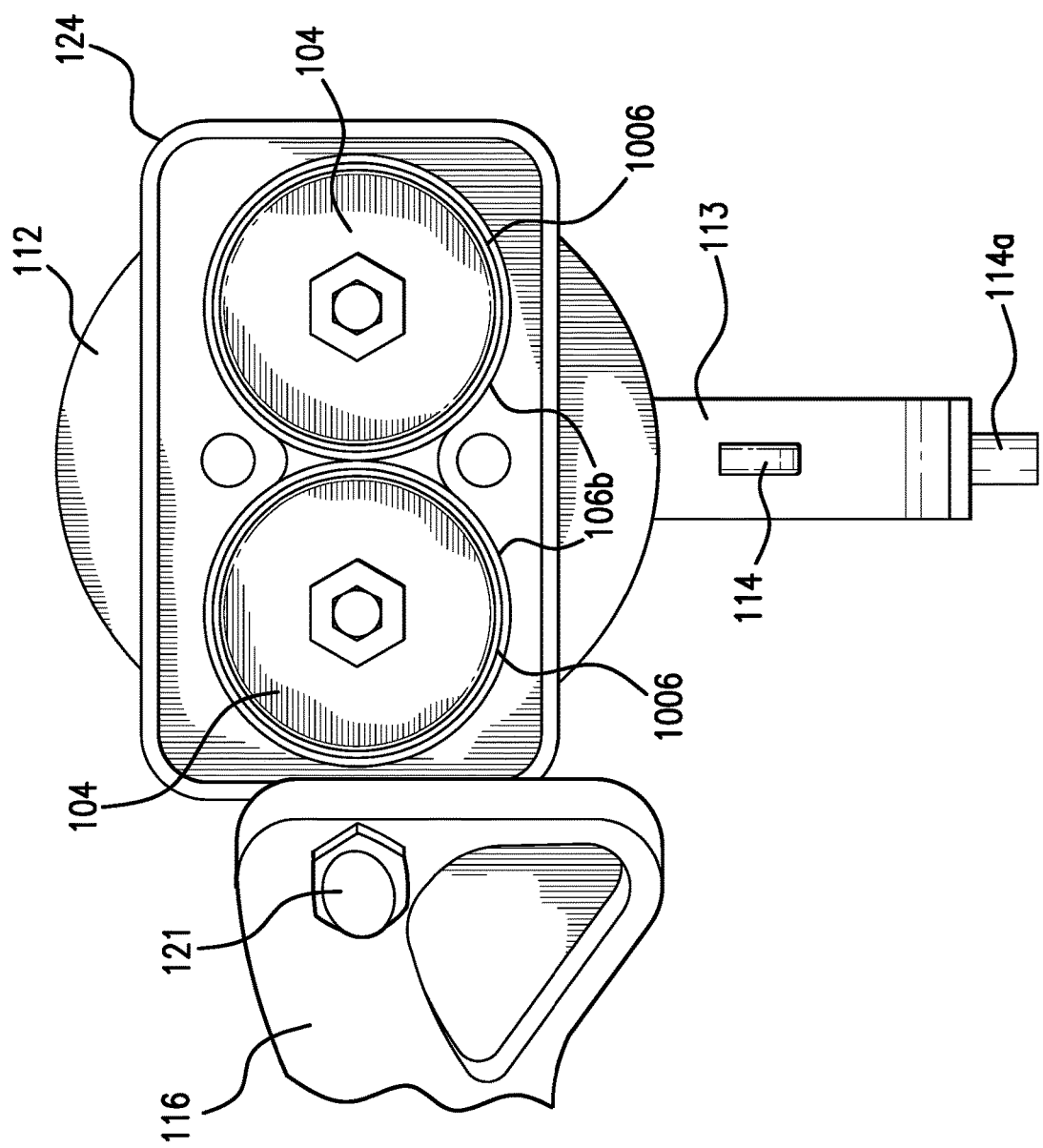
FIG. 4 is a frontal perspective view, partially cut away, similar to the view of FIG. 3, with the arresting member in the open configuration to reveal disks of the pistons extended to the entry openings of compartments defined by the cartridge bay.
Figure 5:
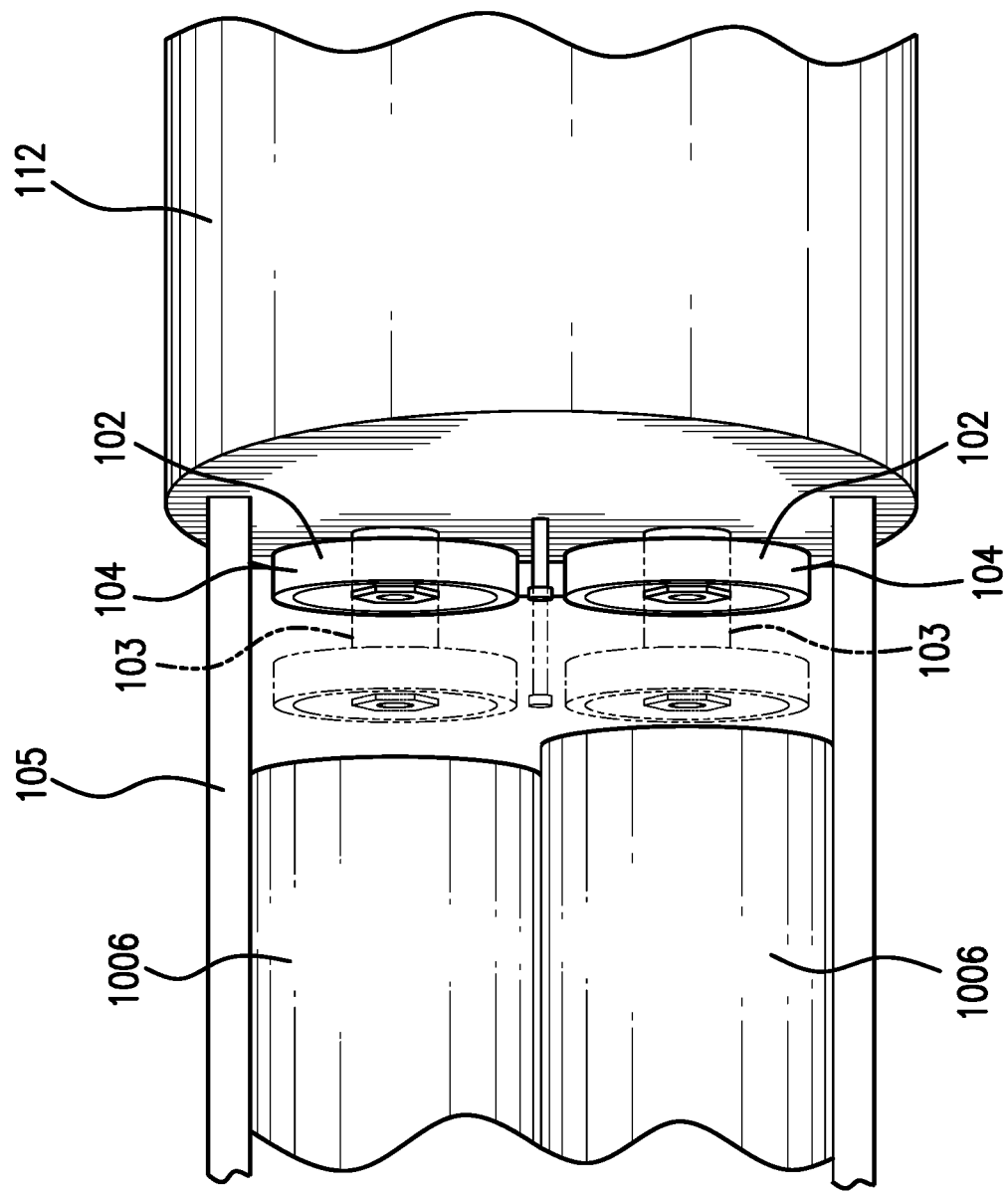
FIG. 5 is an enlarged upper perspective view, partially cut away, of the applicator system embodiment of FIG. 1, with portions of the cartridge bay partially disassembled from other portions of the applicator system to illustrate extending movement of the pistons with respect to the cartridge bay.
Figure 6:
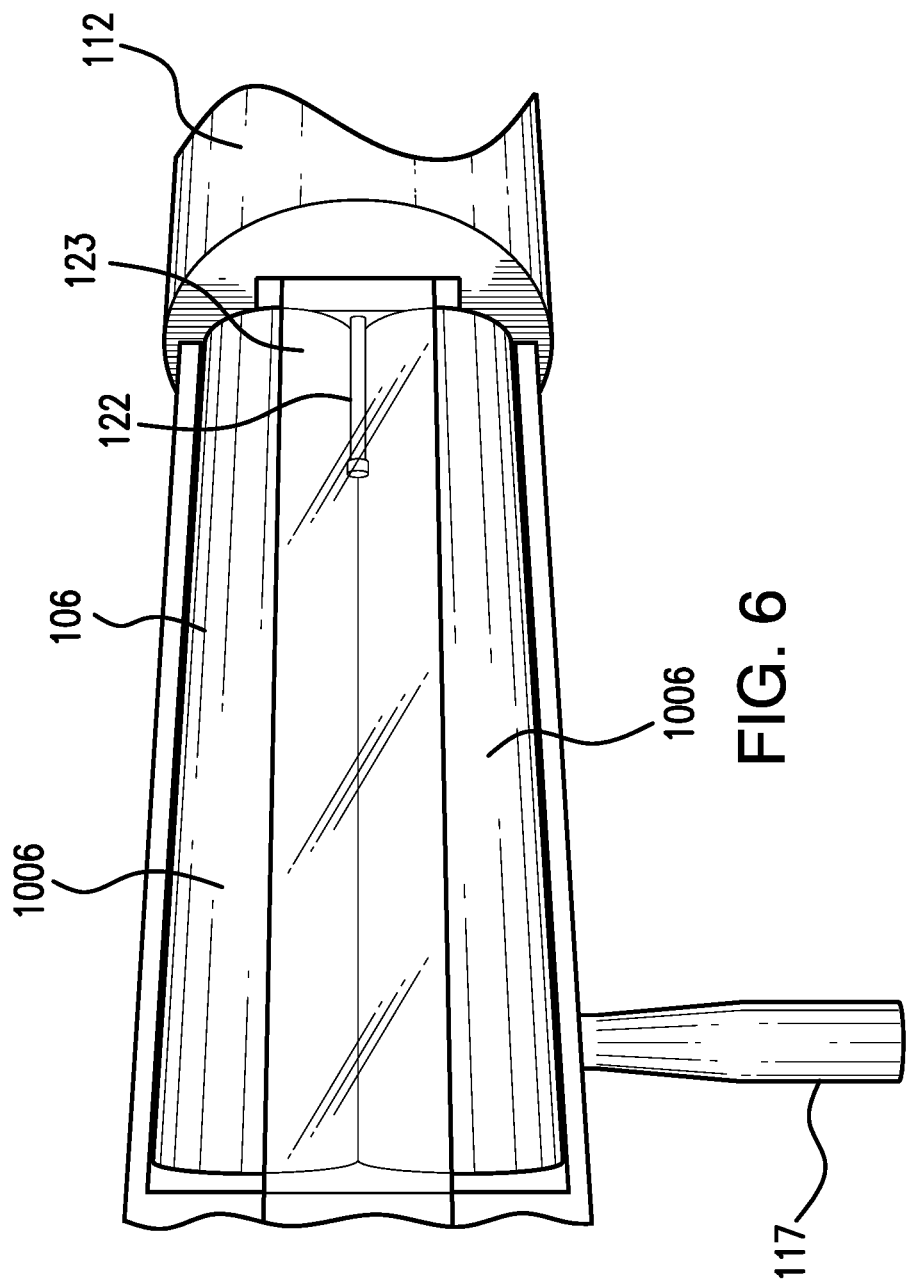
FIG. 6 is an upper perspective view of the applicator system embodiment of FIG. 1 illustrating an indicator rod and a translucent cover to protect the indicator rod.

As shown in FIG. 5, a pair of pistons 102 are adaptively configured to align, each with one of the containment compartments 1006 of the cartridge bay 106. The pistons 102 each preferably include a disk 104 coupled to a rod 103. The rod 103 is coupled to the actuator 101, and the disk 104 is retracted initially to be disposed within a second open terminal end 106b of the cartridge bay 106. The rod 103 is driven in response to activation of the trigger 114 to extend or retract from its position within the pneumatic cylinder 112. In operation, when a cartridge unit 107 is loaded into the cartridge bay, the pistons 102 are typically in their fully retracted position with the disks 104 disposed at a first terminal end of the cartridge bay 106 as shown in FIG. 3. As the piston rod 103 is extended, the disk 104 is correspondingly advanced within the cartridge bay 106, ultimately, to the position shown in FIG. 4 at a second terminal end 106b of the cartridge bay 106. The filled cartridges 108 are correspondingly compressed accordingly from the back end forward within the containment compartments 1006 of the cartridge bay 106, as the pistons' disks 104 engage the cartridge sections 108 to separately drive their component materials out of them. The view of FIG. 8 with a portion of one cylinder structure partially cut away illustrates the squeezing deflection of a cartridge section 108 as it is compressed by disk 104 of piston 102.

The number of pistons 102 employed may be varied depending on the size of the system's pneumatic application structure. The multiple pistons are each suitably configured to apply sufficiently distributed driving force upon the collapsible cartridge sections 108 confined within respective containment compartments 1006 of the cartridge bay 106. The driven advancement of the pistons 102 collectively squeezes the cartridge sections 108 within the inner walls of the containment compartments 1006 of the cartridge bay 106 (and against the arresting member enclosing the second terminal ends 106b of the cartridge bay 106) to squeeze out their materials.

In addition to the piston members shown in the illustrated embodiment, other suitable actuation measures known in the art may be employed to engage a cartridge within the cartridge bay 106 and effectively force extrusion of work material from a cartridge 108 contained therein. For instance, an inflatable balloon or bellows member may provide an alternate form of actuation, being expandable in response to trigger activation to contact a proximal end 108a of each cartridge 108 and force the expulsion of work material therefrom.

While the containment compartments 1006 of cartridge bay 106 are shown to have open second terminal ends 106b for extension of the pistons 102 therein, and to allow for convenient detachable coupling of the cartridge bays 106 to pistons 102, they alternatively may be configured with closed second terminal ends 106b. In such instances, the second terminal end 106b would be substantially closed by a floor or base member having an aperture formed therein. The rod 103 of the piston 102 would be received through the aperture, and the disk 104 would be positioned on an inner surface of floor to engage the contents of the containment compartments 1006, namely, cartridges 108. Such pass-through coupling would provide additional support and guidance for rod 103 within the containment compartments 1006 and may be desirable for applications where ready detachability between the cartridge bay and the pistons is not of great importance.

The drive pistons of the actuator may be operably linked to the activating trigger mechanism via any suitable transmission/coupling linkage known in the art to effect the pistons' displacement responsive to trigger activation. For example, mechanical, electromechanical, pneumatic, hydraulic, electromagnetic, or other such transmission/coupling linkage types known in the art may be employed to suit the particular requirements of the intended application. The linkage mechanism may provide power assist as in the pneumatically powered example disclosed, or may in alternate embodiments simply convey the requisite force responsive to trigger actuation without power assist.

When system 10 is operated in this manner to apply the component compositions of an epoxy material, for example, provided in multiple separate cartridge sections, the component compositions are preferably dispensed simultaneously with mutual proportioning controlled by suitable measures. Proportioning may be effected, for instance, by appropriately dimensioning the cartridge sections and/or dispensing openings. The cartridge bays 106 for housing the cartridge sections 108 are dimensioned accordingly to suit the same. The dispensed compositional components combine in proper parts upon their dispensing and application, and together cure into the desired epoxy composition to be applied.

In other examples, the system may be configured to accommodate a cartridge unit 107 having but a single cartridge section to dispense a singular component, or a pre-mixed composition. In certain other examples, the system may be configured to accommodate a cartridge unit having more than two cartridge sections. The actual configuration employed will depend on the particular requirements of the intended application(s).

In addition to the example of an epoxy material, one skilled in the art will recognize that the disclosed system may be utilized to apply any suitable material required for the intended application. The present invention is therefore not limited to the dispensing/application of any particular material or material type, nor to any particular number of material components dispensed and applied.

Figure 10:
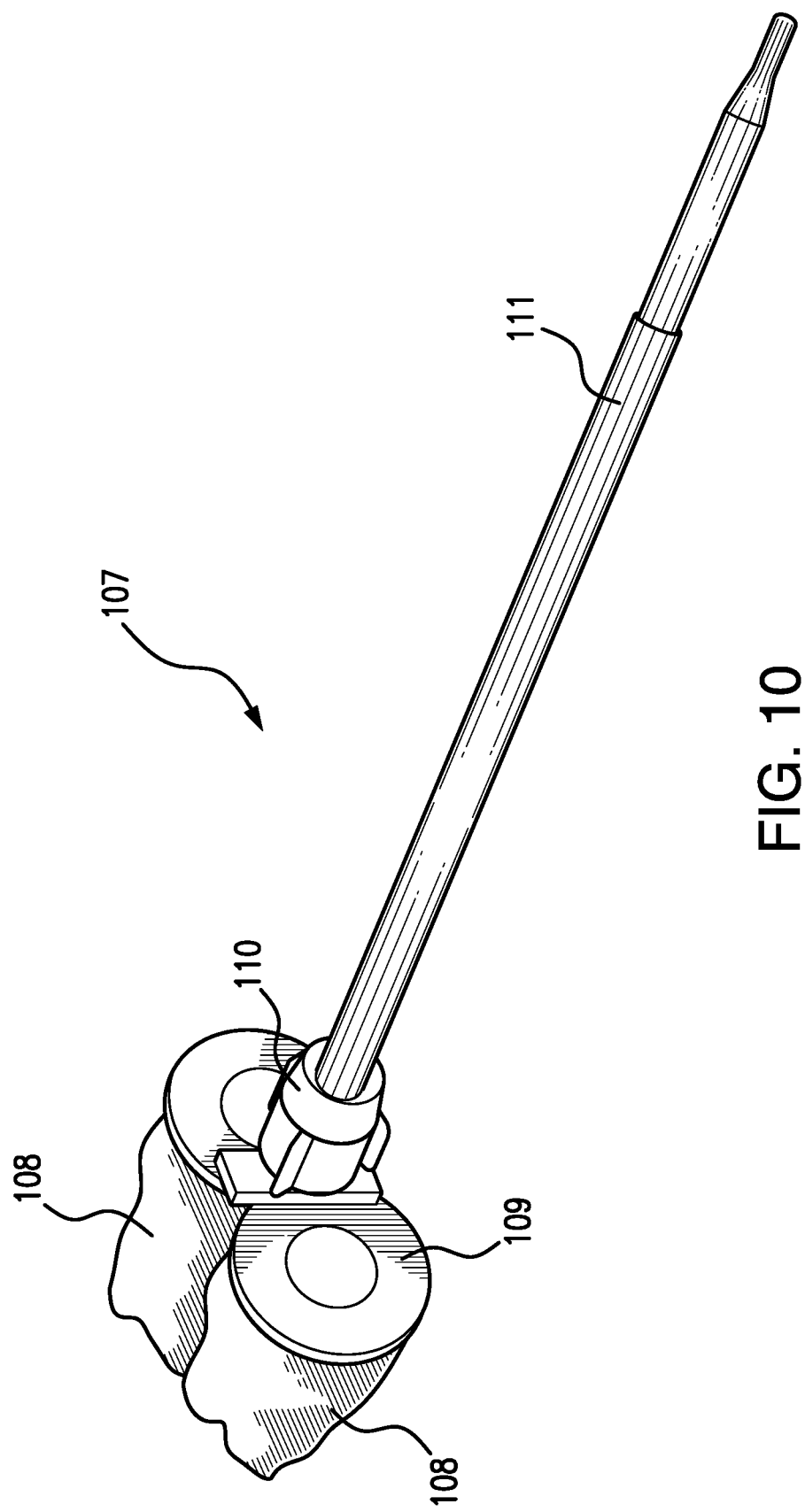

Turning more specifically to the cartridge unit 107, each cartridge section or cartridge 108 defines a flexible, soft casing—much like a soft toothpaste casing which expands when filled and collapses as the contents are squeezed out. The cartridge unit 107 formed with a plurality of such soft casings 108 preferably includes a more rigid dispensing cap 110 which defines an elongate dispensing tip 111 for extruded expulsion of the cartridge's contents. The dispensing tip 111 illustratively shown in one sample configuration in FIG. 10 is formed with an elongate cone-like configuration, but may be formed with any other suitable shape, structure, and relative dimension. The cartridge unit 107 shown in FIG. 10 is adapted for use with both power assisted and manual applicator system embodiments.

While shown with two cartridges 108 having the same size, length and diameter, the cartridges 108 may be configured to have different lengths and diameters one as compared to the other. Similarly, while shown having two cartridges 108, the cartridge unit 107 may be configured to include alternative numbers of individual cartridges depending upon the requirements of the particularly intended application. For example, a single cartridge may be used which includes work material already mixed in desired proportions or in instances where only a single type of work material is needed. Alternatively, the cartridge unit 107 may be configured to include any number of additional cartridges depending on the number of different types of work materials that are needed for a particular application. In applications where a single cartridge or more than two cartridges make up the cartridge unit 107, the cartridge bay 106 is correspondingly configured with containment compartments corresponding to the number of cartridges.

When the cartridge unit 107 is fully dispensed, the emptied/spent cartridge sections' film will have been pressed fully against the dispensing cap 110. The collapsed film and dispensing cap 110 together would then form a compacted structure, much like a crushed beverage can, which may be conveniently and neatly removed from the housing portion and appropriately discarded. This makes for less expensive cartridge units because less structural material is required for each cartridge section, which in turn makes for more environmentally friendly packaging. Also, since the pouch-like, squeezable structure of each collapsible cartridge section 108 requires no dynamic joint between moving parts (such as between a tubular cylinder and displaceable push-up disk capping one end of that cylinder in a conventional cylindrical cartridge), a collapsible cartridge unit 107 tends to be less prone to loss of seal and therefore of potentially longer shelf life. Any loss of seal over time exposes the contained material to air, causing it to cure prematurely, or otherwise spoil.

The system's housing portion 105 contains the films of the cartridge unit 107 (or film pack) which—being without solid structural support built in—would otherwise just flap around whenever they get pushed from one end. The housing portion 105 is also configured to conform smoothly enough to the unit's cartridges, such that it avoids pinching or tearing the films and prevents loose portions of the films from lagging behind or underneath the disk or other driving implement pushing against it.

As shown in FIGS. 2, 3, and 4, the housing portion 105 includes a cartridge bay 106 which defines two containment compartments 1006, and which is open at the front (or terminal ends). The piston 104 disposed in each containment compartment 1006 acts much as plungers inside the cylindrical confines of the barrel-like containment compartments 1006 to push the contained cartridge sections from the rear.

The cylinder structures forming the containment compartments 1006 each serve much the function of the hard outer cylinder, or shell, that non-collapsible cartridges are conventionally equipped with. The built-in cartridge bays of the applicator system thus permit the work materials (to be dispensed) to be provided in the soft liners of the collapsible cartridge sections, which are protected and supported inside the containment compartments 1006.

As described in preceding paragraphs, the system's multi-barrel like cartridge bay may be formed with any suitable shape, other than the cylindrical shape shown in the illustrated embodiment. A disk 104 of the piston 102 of the actuator 101 is preferably disposed as shown emerging from and through the first terminal end of the cartridge bay 106 as shown in FIG. 3. Preferably, the shape and size of each particularly utilized containment compartment 1006 forming the cartridge bay 106 and the push disk 10 displaceably disposed within it are such that the push disk 104 nearly spans the full diametric (or transaxial) space within that containment compartment 1006. Then, as the push disk 104 drives the rear end of the cartridge 108 in the cartridge bay towards its second terminal end (forward end) 106b, the chances of the bag-, or pouch-like film (cartridge) 108 getting pinched between the disk 104 and the bay's surrounding inner wall surface is minimized if not altogether eliminated.

In the embodiments shown, the two containment compartments 1006 of the cartridge bay 106 are preferably isolated from one another so that the cartridge section 108 individually contained in each may be smoothly and safely compressed without sticking or tearing. Each containment compartment 1006 may be formed of any suitable material known in the art having a sufficient combination of strength, rigidity, weight, and other properties necessitated by the particularly intended application. In the embodiment shown, for instance, each barrel is formed of aluminum or other light yet strong metallic material.

Each containment compartment 1006 is preferably formed by a cylinder suitably dimensioned to accommodate a given cartridge section 108 of a multi-pack cartridge unit 107. The multiple barrels of the disclosed system concurrently accommodate the multiple packs (cartridges) 108 extending from a cartridge unit 107 whose dispensing cap 110 joins the packs for combined dispensing through a common tip 111.

As mentioned, each cartridge 108 of the cartridge unit 107 is preferably inserted in a separate containment compartment 1006 of the cartridge bay 106 preferably through the second terminal end 106b. The cartridge bay containment compartments 1006 may be fully or partly partitioned from one another, as long as obstructions or snagging hazard for the skin of the cartridges 108 are avoided when pushed by the piston 102. The multiple containment compartments 1006 may in such embodiments be disposed in mutually open communication.

The cartridge unit 107 is then secured by fitting the face plate 109 of the unit 107 over the bracket 124 covering the forward end of the containment compartments 1006 (the second terminal end 106b of the cartridge bay), and swinging the gate-like arresting member 116 closed to lock the cartridge unit 107 in place. The forward ends of the containment compartments 1006 are secured from relative movements by the bracket member 124 that defines a frame around the cartridge bay 106. The bracket member 124 may be formed of plastic, metal, or any other material known in the art suitable for use to secure the free end of the barrels in the manner described therein. In the illustrated embodiments, the bracket member is preferably made of a sufficiently strong and rigid plastic composition that conforms to the outer contours of the barrels and extending to substantially fill potential gaps between the adjacent cylinders. The bracket member includes ridge-like formations, e.g. pronged protrusive pieces, which act to reduce friction as the bracket member is sleeved onto the free end of the barrels.

When the arresting member 116 is in its open configuration, and when the cartridge has been removed from the cartridge bay, the bracket 124 may be detached from the cartridge bay 106 to enable removal of the cylinders forming the containment compartments 1006. The detachable coupling of the bracket 124 therefore allows for easy replacement of the cartridge bay 106 as a whole or of individual cylinders. Further, when the bracket 124 is removed, the cylinders' containment compartments may be easily accessed for cleaning, replacement, and/or repair as may become necessary. FIG. 5 reflects this independent displacement of the containment compartment 1006 cylinders with respect to one another and the piston members 102 for displacement.

The gate-like arresting member 116 reversibly blocks the forward end of the containment compartments 1006 of the cartridge bay 106 by pivotal displacement about a pivot member 121 extending from bracket 124. Bracket 124 includes a catch member 120, and locking is accomplished by rotation about pivot member 121 so that a free end of the arresting member may engage the catch member 120 as shown in FIGS. 1, 7, and 8. For more secure coupling and securement, the arresting member 116 includes an aperture 116a which is adaptively configured to receive a locking latch 118. The locking latch 118 extends from the body 100 of the applicator system 10 and includes a locking latch handle 119 to facilitate extension and retraction of the locking latch 118 within aperture 116a when the arresting member 116 transitions between open and closed configurations. The locking latch 118 may be spring loaded, and actuated by retraction of the locking latch handle 119. The locking latch 118, while shown as spring loaded, may be of any other suitable locking/latching configuration known in the art sufficient to provide stable retention of the arresting member 116 in its closed configuration. For example, a cotter pin may be used to secure the arresting member 116 to the bracket 124.

When properly placed and releasably locked in its closed configuration, the swing plate-like arresting member 116 gates the cartridge bay 106 closed and retentively supports the cartridge unit 107 in place. The cartridges 108 are then prevented from escaping out of the cartridge bay 106. The arresting member 116 may be formed of plastic, metal, or other such materials known in the art of sufficient strength, rigidity, and weight to provide secure retention of the cartridges in the cartridge bay 106 and buttress the piston-driven compression of the filed cartridges thereagainst.

The system may include a pin or other mechanical stop which serves to limit the arresting member's pivotal displacement relative to the bracket 124. The mechanical stop ensures that, in the open configuration, the arresting member does not interfere with open access to the containment compartments 1006 of the cartridge bay. This is helpful so that a cartridge unit 107 may be removed from or inserted in the cartridge bay without interference from the arresting member 116.

Preferably disposed on the barrel is a longitudinally displaceable level indictor 122 that provides a visual indication of cartridge unit consumption. More specifically, the level indicator 122 is configured and disposed to track in position one or more push disks 104 of the pistons 102 within the containment compartments 1006. The level indicator 122 is preferably formed to include a rod that is coupled to move with the piston 102, or at least maintain a fixed positional relationship therewith. The level indicator 122 thus moves in tandem with the pistons/disks to continually indicate the location of the disks 104 otherwise hidden inside the containment compartments 1006, as they are advanced by actuator 101. By the time all material has been extruded from the respective cartridges 108, the indicator 122 should be positioned corresponding to the forward, or second terminal, end 106b of the cartridge bay 106.

The level indicator 122 may also include a translucent protection screen or shield 123 to protect the level indicator from obstructive debris or other mechanical interference during operation. The protection screen 123 may be formed of Plexiglas or any other material fit for protecting the level indicator while still allowing the user to visually gauge how much material have been dispensed. The protection screen is secured at its ends by suitable fastener to the cartridge unit and protectively encloses the level indicator against the outer surfaces of the cartridge bay 106.

In the disclosed embodiments, the pistons are configured for synchronous actuation and therefore a single indicator rod 122 functions to indicate the positioning of the pistons 102. However, in certain applications where the pistons are independently actuable, system 10 may include separate indicator rods 122 correspondingly coupled to advance in tandem with the separate pistons. In certain other embodiments, the planar protective shield shown may be replaced with a tubular shield disposed about the rod 122, or with shields of other structural configuration suitable for the particularly intended application.

In alternate embodiments, one or more of the cylinders forming containment compartments 1006 may be configured with a slot-like transparent window opening along a longitudinal length which allows for visual indication of the piston disks 104 as they move along within the containment compartments 1006. This would obviate the need for a separate indicator rod.

The applicator system 10 is also capable of altering the mix ratios, e.g. a two to one mix ratio, of the cartridge unit inserted into the barrels. This may be done, for instance, by (1) replacing one of the containment compartment cylinders with a cylinder having a different diameter, (2) using a length offset piston (or adapter), or (3) inserting a cylinder sleeve in the containment compartment 1006 that effectively changes the diameter thereof. If one of the containment compartment cylinders is replaced with a differently sized barrel or adapted by a cylinder sleeve insert, the corresponding disk 104 of piston 102 may require corresponding re-sizing to accommodate.

In the alternate embodiment shown in FIGS. 8-9, the subject applicator system 10 is manually powered by user manipulation of a trigger 114 attached to handle 113. This embodiment, much like the first embodiment described with reference to FIGS. 1-7, generally includes a body portion 100 which includes a housing 105 attached thereto. The housing 105 in turn defines a cartridge bay 106. The cartridge bay 106 forms containment compartments 1006 for receiving a cartridge unit 107 including at least one cartridge section 108 containing a work material to be dispensed. A trigger handle portion 113, 114 is coupled to the body portion 110 for selective control of the actuator 101 relative to the housing portion 105 which forces extruded dispensing of the cartridge-contained material therefrom.

In this exemplary embodiment, the pistons 102 of the actuator 101 are manually driven to extend or retract accordingly, in response to activation of the trigger 114 on handle 113. Actuator 101 may be of any suitable mechanism known in the art. As such mechanisms are well known to those skilled in the art, actuator 101 is not described in further detail herein.

As in the preceding power-assisted embodiment, housing portion 105 in this manual embodiment preferably defines a plurality of barrel-like structures (containment compartments 1006), which together form a tubular cartridge bay 106 for containing a collapsible cartridge unit 1017 filled with a given material. The cartridge bay 106 surrounds the collapsible cartridge sufficiently that when pressed by a drive piston 102 of the actuator 101 from one end of the bay, the material in a respective cartridge 108 of the cartridge unit 107 is squeezed forward toward a dispensing cap 110 and dispensing tip 111. The collapsible cartridge 108 may be of the so-called 'soft cartridge' type formed of a flexible material that defines a containment skin—or film—which expands when filled with the material and collapses when compressed. The surrounding inner walls of each containment compartment 1006 of the cartridge bay 106 of the housing portion 105 provide the counter-support that the tubular cylinder of a conventional push-up type of non-collapsible cartridge would provide. This obviates the need for such tubular cylinder, allowing the system to directly receive soft cartridges or other such collapsible cartridges and reliably dispense the material smoothly and regularly therefrom.

In certain alternate embodiments, the arresting member 116 may be configured as a swing plate that swings open about a differently oriented pivot. For example, the swing plate may swing open forward about a vertical, horizontal, or otherwise oriented pivot axis. In certain other alternate embodiments, individual arresting members may be provided to retain each of the individual cylinders in its chamber. Still in other alternate embodiments, the arresting member may be slidably displaced linearly between its closed and open positions, rather than pivotally or angularly.

The descriptions herein are intended to illustrate possible implementations of the present invention and are not restrictive. While this disclosure has been made in connection with specific forms and embodiments thereof, it will be appreciated that various modifications other than those discussed above may be resorted to without departing from the spirit or scope of the claimed invention. Such variations, modifications, and alternatives will become apparent to the skilled artisan upon review of the disclosure. For example, functionally equivalent elements or method steps may be substituted for those specifically shown and described, and certain features may be used independently of other features, and in certain cases, particular locations of elements or sequence of method steps may be reversed or interposed, all without departing from the spirit or scope of the invention as defined herein. The scope of the claimed invention should therefore be determined with reference to the description above along with their full range of equivalents.

What is claimed is:

1. An applicator system for dispensing of material from a flexible pre-charged portion of a cartridge unit, the system comprising:

a housing portion including a cartridge bay and a retention structure disposed detachably at a terminal end region of said cartridge bay, said cartridge bay including at least one removable containment compartment that extends from a first opening to a second opening spaced from the first opening along a longitudinal axis, said removable containment compartment being configured to receive a flexible pre-charged portion of the cartridge unit in a direction substantially parallel to the longitudinal axis through the first opening until the flexible pre-charged portion is substantially enclosed within said removable containment compartment, said retention structure being configured to transition between an open configuration and a closed configuration to releasably retain the cartridge unit against forward escape from said cartridge bay, wherein in the closed configuration, the retention structure extends across the first opening of the at least one removable containment compartment, said retention structure defining a notched passage to receive an elongate dispensing tip portion of the cartridge unit therethrough when the cartridge unit is received within said cartridge bay such that the cartridge unit extends from the removable containment compartment through the notched passage of the retention structure;

an actuator portion coupled to said housing portion in communication with said cartridge bay, said actuator portion including a drive member extending through the second opening of said removable containment compartment and engaging the flexible pre-charged portion of the cartridge unit within said removable containment compartment; and, an activation member coupled to said actuator portion to selectively activate displacement of said drive member within said removable containment compartment responsive to user manipulation, said drive member being selectively driven thereby to compress the flexible pre-charged portion in a forward direction along and in direct contact with a surrounding inner surface of said removable containment compartment toward said retention structure to cause dispensing of the material from the flexible pre-charged portion.

2. The applicator system as recited in claim 1, wherein said retention structure includes an arresting member displaceable between the open and closed configurations relative to said cartridge bay, and said housing portion includes a stop element configured to limit a range of motion of said arresting member in the open configuration to preserve clearance for unobstructed insertion of the cartridge unit into an open terminal end of said cartridge bay.

3. The applicator system as recited in claim 2, wherein said housing portion includes a bracket disposed about said cartridge bay, said arresting member being pivotally coupled to said bracket.

4. The applicator system as recited in claim 1, wherein said cartridge bay includes a plurality of said removable containment compartments, said cartridge bay being thereby configured to receive a cartridge unit having a dispensing cap forming a mixer head and a plurality of the pre-charged cartridge portions extending therefrom.

5. The applicator system as recited in claim 4, wherein each of said removable containment compartments is defined by a containment member having a tubular structure forming a contiguous cylindrical inner wall surface.

6. The applicator system as recited in claim 5, wherein at least one of said containment members is removably disposed in said housing portion.

7. The applicator system as recited in claim 6, wherein said housing portion includes a bracket disposed about said cartridge bay, said bracket releasably securing said removably disposed containment member in said housing portion.

8. The applicator system as recited in claim 1, wherein a handle is coupled to said housing portion, said handle including:
an inlet member for coupling to an external source of pressurized air; and,
an air hose coupled extending between said handle and a regulator of a pneumatic cylinder to guide a stream of pressurized air received through said inlet member thereto, responsive to said activation member.

9. The applicator system as recited in claim 1, wherein said housing portion includes a level indicator disposed in displaceable manner over said cartridge bay, said level indicator being displaceable with said driving member to visually indicate the location thereof within said removable containment compartment.

10. The applicator system as recited in claim 1, wherein said actuator portion is manually driven.

11. An applicator system for dispensing of material from flexible pre-charged sections of a cartridge unit, the system comprising:
a housing portion including:
a cartridge bay defining a plurality of containment members respectively defining a plurality of containment compartments, each containment compartment defining a chamber extending about a longitudinal axis from a containment opening at a terminal end of said cartridge bay, each chamber being configured to receive through the containment opening one flexible pre-charged section of the cartridge unit in a direction substantially parallel to the longitudinal axis and substantially enclose the flexible pre-charged section of a cartridge unit in substantially conformed manner therein, at least one of said containment members being removably disposed, the cartridge unit having a dispensing cap forming a mixer head and a plurality of the pre-charged sections extending therefrom; and,
a retention structure disposed detachably at the terminal end of said cartridge bay forward of said cartridge bay, said retention structure being configured to transition between an open configuration and a closed configuration to releasably retain the cartridge unit against forward escape from said cartridge bay, wherein in the closed configuration, the retention structure extends across the containment opening of each containment compartment, said retention structure defining a notched passage to receive an elongate dispensing tip portion of the cartridge unit therethrough such that the cartridge unit extends from the plurality of containment compartments through the notched passage of the retention structure;
an actuator portion coupled to said housing portion in communication with said cartridge bay, said actuator portion including a plurality of drive members each engaging one of the flexible pre-charged sections of the cartridge unit within one of said containment compartment; and,
an activation member coupled to said actuator portion to selectively activate displacement of said drive members within said containment compartments responsive to user manipulation, said drive members being selectively driven thereby to compress the flexible pre-charged sections in a forward direction along and in direct contact with surrounding inner surfaces of respective containment compartments toward said retention structure.

12. The applicator system as recited in claim 11, wherein said retention structure includes an arresting member pivotally coupled to said housing portion.

13. The applicator system as recited in claim 12, wherein said housing portion includes a stop element configured to limit a range of motion of said arresting member in the open configuration at a position relative to said cartridge bay to preserve clearance for unobstructed insertion of the cartridge unit into an open terminal end of said cartridge bay.

14. The applicator system as recited in claim 11, wherein each of said containment members defines a tubular structure forming a contiguous cylindrical inner wall surface about one chamber.

15. The applicator system as recited in claim 14, wherein said housing portion includes a bracket secured about the terminal end of said cartridge bay for releasably securing said removably disposed containment member in said housing portion.

16. The applicator system as recited in claim 11, wherein said actuator portion includes a pneumatic cylinder and at least one piston extending in axially displaceable manner therefrom to extend into said containment compartment of said cartridge bay; and, a handle is adjustably attached to said pneumatic cylinder, said handle including:
an inlet member for coupling to an external source of pressurized air; and,
an air hose coupled extending between said handle and a regulator of said pneumatic cylinder to guide a stream of pressurized air received through said inlet member thereto, responsive to said activation member.

17. The applicator system as recited in claim 11, wherein said actuator portion is manually driven.

18. An applicator system for dispensing of material from flexible pre-charged portions of a cartridge unit, the system comprising:
- a body portion having an actuator portion and a housing portion coupled thereto;
- said housing portion including:
  - a cartridge bay defining a plurality of removably disposed containment members respectively defining a plurality of containment compartments, each containment compartment defining a chamber extending about a longitudinal axis from a containment opening at a terminal end of said cartridge bay, each of said containment compartments being configured to receive one pre-charged portion of a cartridge unit through the containment opening in a direction substantially parallel to the longitudinal axis in substantially conformed manner therein, each of said containment members having a tubular structure forming a contiguous cylindrical inner wall surface about one said containment compartment, the cartridge unit having a dispensing cap forming a mixer head and a plurality of the pre-charged portions extending therefrom;
  - a retention structure disposed detachably at a terminal end region of said cartridge bay forward of said cartridge bay, said retention structure being configured to transition between an open configuration and a closed configuration to releasably retain the cartridge unit against forward escape from said cartridge bay, wherein in the closed configuration, the retention structure extends across the containment opening of each containment compartment, said retention structure defining a notched passage to receive an elongate dispensing tip portion of the cartridge unit therethrough such that the cartridge unit extends from the plurality of containment compartments through the notched passage of the retention structure; and,
- said actuator portion being coupled to said housing portion in communication with said cartridge bay, said actuator portion including a plurality of drive members respectively engaging the pre-charged portions of the cartridge unit respectively within said containment compartments;
- wherein a handle and an activation member are coupled to said body portion, said activation member being coupled to said actuator portion to selectively activate displacement of said drive members within said containment compartments responsive to user manipulation, said drive members being selectively driven thereby to compress the pre-charged portions of the cartridge unit within said containment compartments.

19. An applicator system for dispensing of material from flexible pre-charged portions of a cartridge unit, the system comprising:
- a body portion having an actuator portion and a housing portion coupled thereto;
- said housing portion including:
  - a cartridge bay defining a plurality of removably disposed containment members respectively defining a plurality of containment compartments, each of said containment compartments extending along a longitudinal axis to receive one pre-charged portion of a cartridge unit in substantially conformed manner therein along a direction substantially parallel to the longitudinal axis, each of said containment members having a tubular structure forming a contiguous cylindrical inner wall surface about one said containment compartment, the cartridge unit having a dispensing cap forming a mixer head and a plurality of the pre-charged portions extending therefrom;
  - a retention structure disposed at a terminal end region of said cartridge bay forward of said cartridge bay, said retention structure defining a notched passage to receive an elongate dispensing tip portion of the cartridge unit therethrough, said retention structure being configured to block the cartridge unit against forward escape from said cartridge bay; and,
- said actuator portion being coupled to said housing portion in communication with said cartridge bay, said actuator portion including a plurality of drive members respectively engaging the pre-charged portions of the cartridge unit respectively within said containment compartments;
- wherein a handle and an activation member are coupled to said body portion, said activation member being coupled to said actuator portion to selectively activate displacement of said drive members within said containment compartments responsive to user manipulation, said drive members being selectively driven thereby to compress the pre-charged portions of the cartridge unit within said containment compartments;
- wherein said housing portion includes:
  - a level indicator disposed in displaceable manner over said cartridge bay, said level indicator being displaceable with said driving member to visually indicate the location thereof within said containment compartment; and,
  - a translucent shield protectively disposed at least partially about said level indicator.

* * * * *